United States Patent [19]

Heath et al.

[11] Patent Number: 5,294,095
[45] Date of Patent: Mar. 15, 1994

[54] FLUIDIZED BED WITH SUBMERGED INFRARED LAMPS

[75] Inventors: James E. Heath, Andover; John R. Eppeland, St. James, both of Minn.

[73] Assignee: BGK Finishing Systems, Inc., Minneapolis, Minn.

[21] Appl. No.: 924,399

[22] Filed: Aug. 3, 1992

Related U.S. Application Data

[63] Continuation of Ser. No. 535,468, Jun. 8, 1990, abandoned.

[51] Int. Cl.⁵ .............................................. F26B 17/00
[52] U.S. Cl. ......................................... 266/87; 266/103; 266/172; 432/58
[58] Field of Search .................. 266/87, 172, 252; 432/58, 15; 219/10.65, 553; 392/411, 416, 417, 407

[56] References Cited

U.S. PATENT DOCUMENTS

| | | | |
|---|---|---|---|
| 3,404,874 | 10/1968 | Wynne | 266/208 |
| 3,685,165 | 8/1972 | Deve . | |
| 4,399,984 | 8/1983 | Bouchon | 266/252 |
| 4,437,834 | 3/1984 | Vogel | 432/14 |
| 4,491,277 | 1/1985 | Bauer et al. . | |
| 4,563,151 | 1/1986 | Vogel | 432/15 |
| 4,700,766 | 10/1987 | Godderidge . | |
| 4,738,615 | 4/1988 | Bailey et al. . | |
| 4,752,061 | 6/1988 | Dalton et al. | 266/87 |
| 4,780,966 | 11/1988 | Harding . | |
| 4,800,252 | 1/1989 | Steixner | 219/306 |
| 4,818,849 | 4/1989 | Matlen | 219/354 |
| 4,885,454 | 12/1989 | Lavoie et al. | 219/390 |
| 4,978,076 | 12/1990 | Andrews et al. . | |
| 5,189,813 | 3/1993 | Heath et al. | 266/103 |

FOREIGN PATENT DOCUMENTS

| | | |
|---|---|---|
| 868257 | 4/1971 | Canada . |
| 1193067 | 9/1985 | Canada . |
| 0025818 | 4/1981 | European Pat. Off. . |
| 0060303 | 9/1982 | European Pat. Off. . |
| 0122029 | 10/1984 | European Pat. Off. . |
| 3622668 | 2/1988 | Fed. Rep. of Germany . |
| 2618539 | 1/1989 | France . |
| 1293187 | 10/1972 | United Kingdom . |

*Primary Examiner*—Scott Kastler
*Attorney, Agent, or Firm*—Merchant, Gould, Smith, Edell, Welter & Schmidt

[57] ABSTRACT

An apparatus is disclosed for heat treating a product. The apparatus includes a retort having a predetermined volume for receiving a bed of fluidizing particles at having a predetermined elevation within the volume and a plurality of electrically powered infrared radiation lamps. The lamps are submerged within the bed of fluidizing particles.

22 Claims, 3 Drawing Sheets

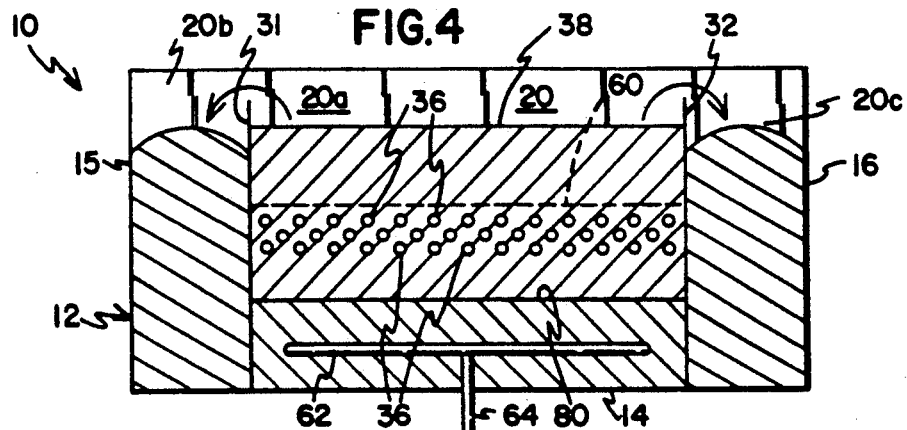
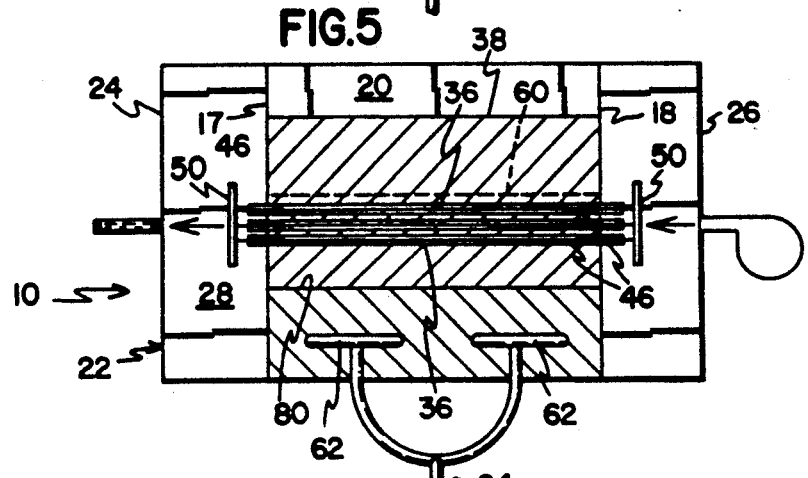
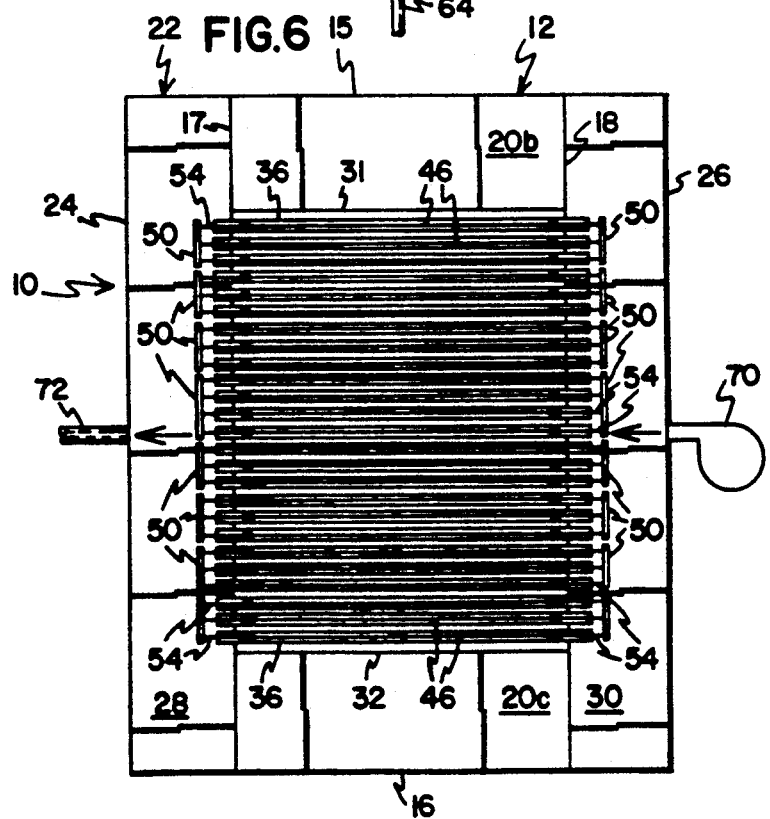

FLUIDIZED BED WITH SUBMERGED INFRARED LAMPS

This is a continuation of application Ser. No. 07/535,468, filed Jun. 8, 1990, now abandoned.

BACKGROUND OF THE INVENTION

1. Field of the Invention

This invention pertains to improvements in the controlled heat treating of products. More particularly, this invention pertains to a fluidized bed heat treatment apparatus with infrared radiation heating sources.

2. Description of the Prior Art

The use of fluidized bed furnaces for heat treating a product is well known. Such furnaces heat a bed of particles so as to develop an extremely hot bed of fluidizing particles such as, for example aluminum oxide. The furnaces can be used for both the continuous processing of a product or the batch processing of products.

U.S. Pat. No. 4,752,061 (of which the present inventor is a co-inventor) teaches a fluidized bed furnace which uses infrared radiation as the heating source. One advantage of using infrared radiation as the heating source is that it permits the use of inert gases to fluidize the particles with a furnace. As a result, a controlled atmosphere can be provided surrounding the product being heat treated within the furnace.

The aforenoted U.S. Pat. No. 4,752,061 places the infrared lamps out of the bed behind a quartz wall or screen. As a result, the distance from the infrared lamps to the bed results in the development of a high temperature gradient with too little of the energy source contributing to the fluidization of the bed. This leads to a significant amount of energy inefficiency. In addition, the infrared lamps may be in close proximity to the stainless steel retort. This could result in partial melting of the retort.

SUMMARY OF THE INVENTION

According to a preferred embodiment of the present invention, an apparatus is disclosed for heat treating a product. The apparatus includes a retort having walls defining a furnace volume. A bed of fluidizing particles is disposed within the volume. A plurality of electrically powered infrared lamps are provided in a submerged mode within the bed.

III. BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 4 is a side elevation schematic representation of the furnace of the present invention;

FIG. 5 is an end elevation view, shown schematically, of the furnace of the present invention; and FIG. 6 is a top plan view, shown schematically, of the furnace of the present invention.

IV. DESCRIPTION OF THE PREFERRED EMBODIMENT

Figure 1:
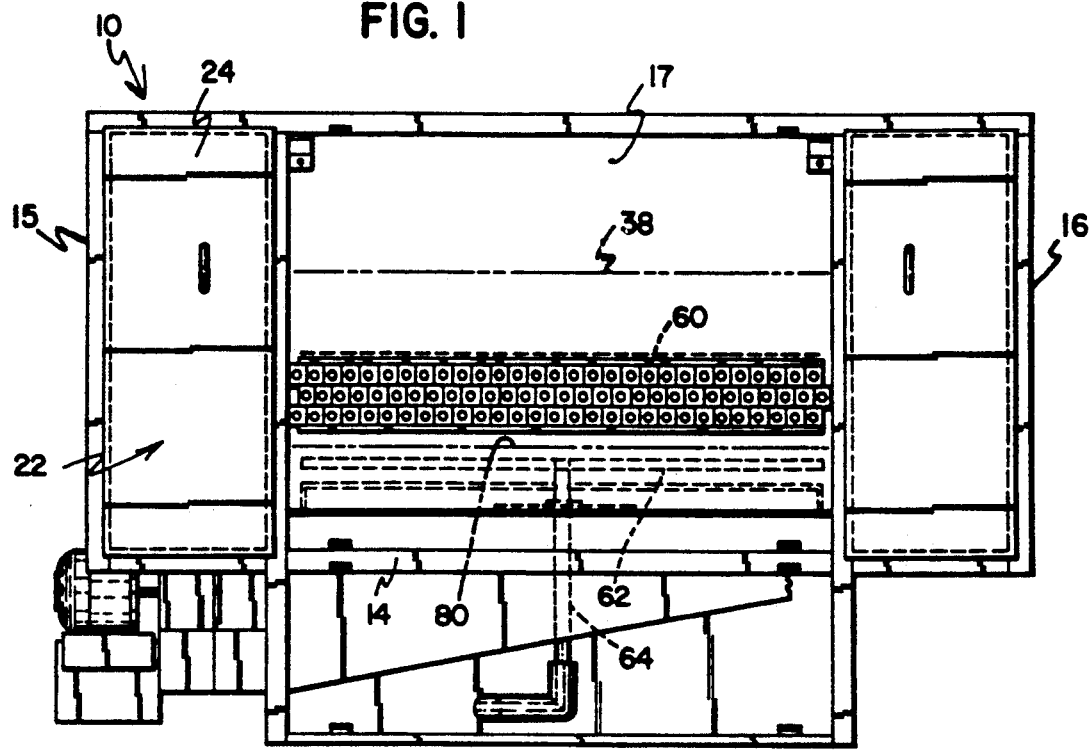
FIG. 1 is a side elevation view of a fluidizing bed furnace constructed according to the present invention, with a portion of the outer skin removed to expose certain interior elements of the furnace.

Referring now to the various figures in which identical elements are numbered identically throughout, the description of the preferred embodiment will now be given with the furnace of the present invention being designated generally by means of the reference character 10. As shown best in FIGS. 4 and 5, the furnace 10 includes a retort 12, which is preferably formed of R330 stainless steel or the like. The retort 12 includes a bottom wall 14, end walls 15, 16 and side walls 17, 18. Walls 14–18 cooperate to define a retort interior 20. A cover (not shown in the Figures) may be provided so as to cover the top of the retort 12.

The furnace 10 also includes an outer shell 22 as is shown best in FIGS. 5 and 6. Outer shell 22 includes a first outer shell wall 24 covering wall 17, and a second outer shell wall 26 covering wall 18. In FIG. 1, a central portion of shell wall 24 has been removed to expose wall 17. Wall 24 and wall 17 cooperate to define an exhaust plenum 28. Walls 26 and 18 cooperate to define an inlet plenum 30.

As best shown in FIGS. 4 and 6, interior divider walls 31 and 32 are provided within the interior 20. Walls 31, 32 extend between side walls 17 and 18 and are parallel to end walls 15 and 16. The divider walls 31, 32 extend upwardly from floor 14 and terminate beneath the top of the retort 12. Walls 31, 32 divide retort interior 20 into a fluidizing chamber 20a, a first overflow chamber 20b, and a second overflow chamber 20c (see FIG. 4).

A plurality of quartz tubes 36 extend between and through walls 17 and 18. As shown, the tubes 36 are disposed in parallel alignment with respect to each other, are generally perpendicular to side walls 17, 19 and are parallel to the floor 14 of the retort 12. The tubes 36 are disposed within the fluidizing portion 20a of interior 20, and are located beneath a predetermined elevation 38 (see FIG. 4) of the fluidizing particles to be retained within the chamber 20a.

Figure 3:
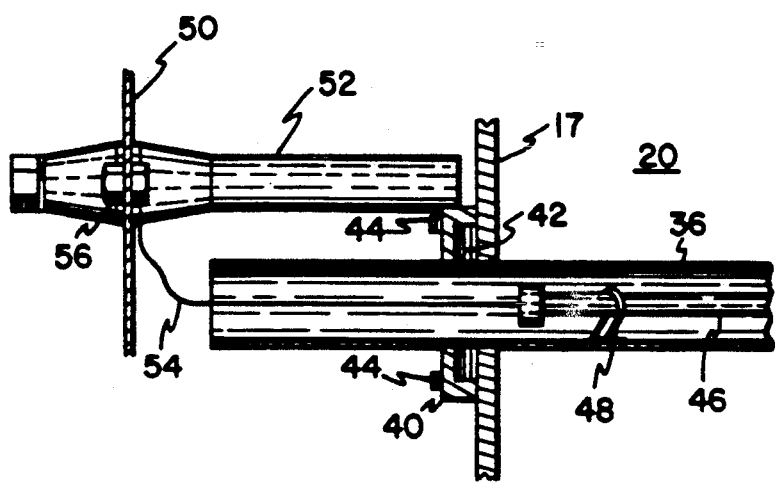
FIG. 3 is a side elevation view, shown partially in section, showing the connection of the infrared heating elements to the bus plates.

FIG. 3 shows the attachment of the each tube 36 to side wall 17. The quartz tube 36 is similarly attached to side wall 18. As shown in FIG. 3, the tube 36 extends through side wall 17, and is connected to the side wall 17 by means of a steel mounting clamp 40. The clamp 40 houses a plurality of ceramic washers 42. The clamp 40 is attached to side wall 17 by means of bolts 44.

An infrared lamp 46 is disposed within each one of the tubes 36, as best shown in FIGS. 2, 3, 5 and 6, (for clarity, the lamps are not shown within the tubes 36 in FIGS. 1 and 4). Each lamp 46 is completely contained between walls 17, 18, and is retained in coaxial alignment within tube 36 by means of a mounting clip 48.

Figure 2:
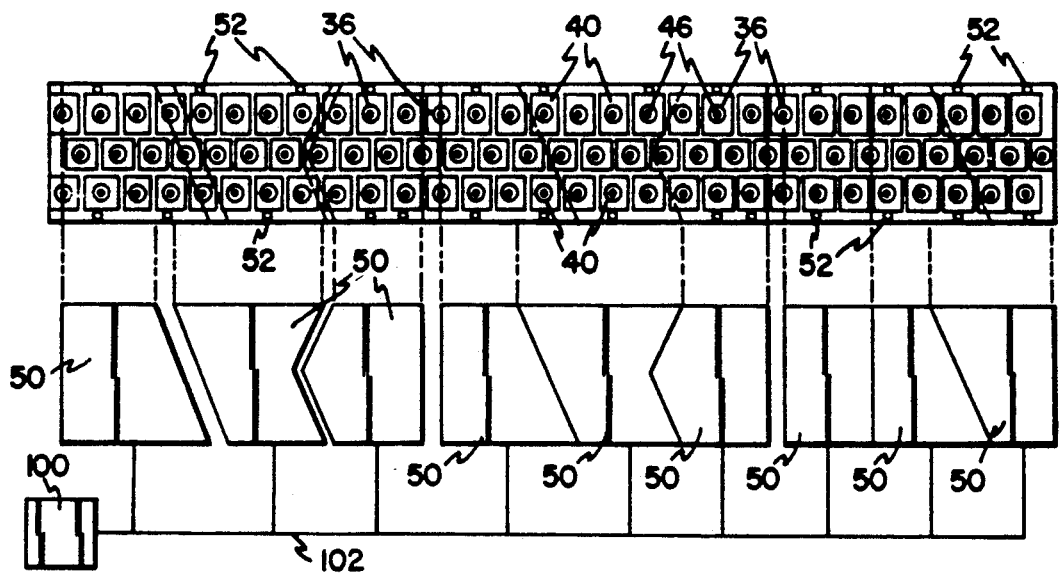
FIG. 2 is an enlarged view of particular interior elements of the furnace of FIG. 1, with the bus plates shown removed.

In order to provide electrical energy to the plurality of lamps 46, a plurality of bus bar plates 50 are provided. (For clarity, the bar plates are not shown in FIGS. 1 and 4.) As shown in FIG. 2, nine bus bar plates are provided for each side wall 17, 18 of the retort 12. In the schematic representation of FIG. 6, eight bus bar plates are shown in connection with each side wall.

The bus bar plates 50 are electrically conductive plates of metal. Each plate 50 is connected to a separately controllable source (not shown) of electrical power which is therefore capable of separately or individually energizing each plate 50.

The plates 50 are secured to the walls 17, 18 by means of bus bar plate mounts 52 (see FIG. 3), which are preferably ceramic. A lead 54 connects each infrared lamp 46 to the bus bar plate 50. The lead 54 is connected to the bus bar plate 50 by means of a nut and bolt combination 56.

As best shown in FIG. 2, a plurality of lamps 46 are covered by means of a particular bus bar plate 50. In the expanded view of FIG. 2, each of the bus bar plates 50 is removed from covering the lamps 46 and tubes 36. The positioning of the bus bar plates 50 over the lamps 46 in FIG. 2 is shown in phantom lines. As a result of having a plurality of lamps 46 covered by means of a plurality of different bus bar plates 50, the length of the fluidizing chamber 20a can be divided into a plurality of zones. Each bus bar plate 50 with its associated lamps 46 constitutes a given zone. By separately regulating the current provided to each bus bar plate 50, the intensity of the lamps connected to such bus bar plate 50 can be separately controlled. As a result, a temperature gradient can be created across the length of the chamber 20a.

As shown in FIGS. 1, 4 and 5, a stainless steel screen 60 is placed above the lamps 46 and quartz tubes 36. The screen 60 prevents a product that is being heat treated within the fluidized bed from falling onto the quartz tubes 36 and possibly damaging them.

Fluidizing tubes 62 are disposed between the floor 14 and the quartz tubes 36. The tubes 62 are connected by means of a conduit 64 to a source (not shown) of a fluidizing gas. The fluidizing gas may be air or any inert gas such as, for example, nitrogen. The fluidizing tubes 62 may be such as those shown and described in U.S. Pat. No. 4,752,061 and indicated by means of reference numerals 98 shown in FIG. 5 of that patent.

A coolant mechanism is provided for conducting a cooling fluid (preferably air) through the tubes 36 so as to cool the infrared lamps 46. A blower 70 is connected to inlet plenum 30. An exhaust fan (not shown) may be connected through an exhaust conduit 72 to exhaust plenum 28. As a result, cooling air may be forced from plenum 30 through each of tubes 36 into plenum 28 and out exhaust conduit 72.

A bed of fluidizing particles (preferably granular aluminum oxide) is provided within the retort 12. A first layer 80 of coarse particles (preferably of 12 grit size) is provided so as to cover the fluidizing tubes 62 and the same terminates beneath the quartz tubes 36. Finer aluminum oxide sand (preferably of 100 grit size) rests atop the coarser sand 80, and terminates at level 38. The coarser sand 80 diffuses the fluidizing gas from the fluidizing tubes 62, and distributes it evenly to the quartz tubes 36.

In operation, the infrared lamps 46 may heat or comprise temperatures from 0° to 4000° F. The aluminum oxide will heat from 0° to 2100° F. A controller 100 (schematically shown in FIG. 2) is connected through means of control lines 102 to each one of the bus plates 50. Through means of the operation of controller 100, the potential upon each one of the bus plates 50 may be separately controlled. Accordingly, the plurality of infrared lamps 46 are divided into a plurality of separately controllable zones.

In operation, the lamps 46 heat the aluminum oxide. The fluidizing gas from tubes 62 fluidizes the aluminum oxide. The divider walls 31, 32 capture within chambers 20b and 20c any aluminum oxide which spills out of the fluidizing chamber 20a.

Through the foregoing detailed description of the present invention, it has been shown how the invention has been obtained in a preferred manner. However, modifications and equivalents of the disclosed concepts, such as those which will readily occur to one skilled in the art, are intended to be included within the scope of this invention which is defined by means of the appended claims.

What is claimed is:

1. Apparatus for heat treating a product comprising:
    means defining a volume for receiving a bed of fluidized particles having a predetermined elevation within said volume;
    a bed of fluidized particles, having a predetermined elevation, disposed within said volume;
    a plurality of electrically powered infrared radiation generating lamps, for generating infrared radiation heat for heating said bed of fluidized particles, disposed within said bed with said particles surrounding each of said lamps for said particles opposing said lamps to be exposed to infrared radiation generated by said lamps; and
    said plurality of lamps divided into a plurality of separately controllable zones of said lamps with lamps of each zone operable independent of others of said zones to permit varying infrared intensity between lamps of different zones.

2. An apparatus according to claim 1 comprising gas admission means for admitting a fluidizing gas to said volume beneath said lamps.

3. Apparatus for heat treating a product comprising:
    means defining a volume for receiving a bed of fluidized particles having a predetermined elevation within said volume;
    a bed of fluidized particles, having a predetermined elevation, disposed within said volume;
    a plurality of electrically powered infrared radiation generating lamps, for generating infrared radiation heat for heating said bed of fluidized particles, disposed within said bed with said particles surrounding each of said lamps for said particles opposing said lamps to be exposed to infrared radiation generated by said lamps;
    said plurality of lamps divided into a plurality of separately controllable zones of said lamps with lamps of each zone operable independent of others of said zones to permit varying infrared intensity between lamps of different zones;
    a plurality of infrared transparent conduits surrounding each of said lamps; and
    wherein said conduits are quartz.

4. An apparatus according to claim 1 wherein said conduits are mutually disposed for a fluidized bed to flow around and between said conduits.

5. Apparatus for heat treating a product comprising:
    means defining a volume for receiving a bed of fluidized particles having a predetermined elevation within said volume;
    a bed of fluidized particles, having a predetermined elevation, disposed within said volume;
    a plurality of electrically powered infrared radiation generating lamps, for generating infrared radiation heat for heating said bed of fluidized particles, disposed within said bed with said particles surrounding each of said lamps for said particles opposing said lamps to be exposed to infrared radiation generated by said lamps;

said plurality of lamps divided into a plurality of separately controllable zones of said lamps with lamps of each zone operable independent of others of said zones to permit varying infrared intensity between sources of different zones;

a plurality of infrared transparent conduits surrounding each of said lamps; and said conduits and said lamps are mutually sized for opposing surfaces of said lamps and said conduits to define a plurality of air flow passages surrounding said lamps, and cooling means for supplying a flow of cooling fluid to said passages so as to cool said lamps.

6. Apparatus for heat treating a product, comprising:
a retort having walls for defining a predetermined volume;
a bed of fluidized particles disposed within said predetermined volume;
a plurality of electrically powered infrared radiation generating lamps, for generating infrared radiation heat for heating said bed of fluidized particles, each of said lamps disposed submerged within said bed and surrounded by said particles for said particles surrounding said lamps to be exposed to infrared radiation generated by said lamps.

7. An apparatus according to claim 6 comprising means for admitting a fluidizing gas to said volume beneath said lamps.

8. An apparatus according to claim 6 wherein said lamps are divided into a plurality of separately controllable zones.

9. An apparatus according to claim 6 wherein said bed includes at least two layers, including a first layers of coarse particles and a second layer of fine particles, with said coarse layer disposed beneath said conduits.

10. An apparatus for heat treating a product, comprising:
a retort having walls for defining a predetermined volume;
a bed of fluidized particles disposed within said predetermined volume;
a plurality of electrically powered infrared radiation generating lamps, for generating infrared radiation heat for heating said bed of fluidized particles, each of said lamps disposed submerged within said bed and surrounded by said particles for said particles surrounding said lamps to be exposed to infrared radiation generated by said lamps;
a plurality of infrared transparent conduits surrounding each of said lamps; and
wherein said conduits are quartz.

11. An apparatus for heat treating a product, comprising:
a retort having walls for defining a predetermined volume;
a bed of fluidized particles disposed within said predetermined volume;
a plurality of electrically powered infrared radiation generating lamps, for generating infrared radiation heat for heating said bed of fluidized particles, each of said lamps disposed submerged within said bed and surrounded by said particles for said particles surrounding said lamps to be exposed to infrared radiation generated by said lamps;
a plurality of infrared transparent conduits surrounding each of said lamps; and wherein said conduits are mutually disposed for a fluidized bed to flow around and between said conduits.

12. An apparatus for heat treating a product, comprising:
a retort having walls for defining a predetermined volume;
a bed of fluidized particles disposed within said predetermined volume;
a plurality of electrically powered infrared radiation generating lamps, for generating infrared radiation heat for heating said bed of fluidized particles, each of said lamps disposed submerged within said bed and surrounded by said particles for said particles surrounding said lamps to be exposed to infrared radiation generated by said lamps;
a plurality of infrared transparent conduits surrounding each of said lamps; and
wherein said conduits and said lamps are mutually sized for opposing surfaces of said lamps and said conduits to define a plurality of air flow passages surrounding said lamps, cooling means for supplying a flow of a cooling flow to said passages.

13. Apparatus as set forth in claim 1, wherein:
said electrically powered source of infrared radiation comprises an electrically powered infrared radiation lamp.

14. Apparatus as set forth in claim 2 wherein:
said means for admitting a fluidized gas to said volume beneath said lamp includes means for connecting a source of nitrogen to said volume beneath said lamps.

15. Apparatus as set forth in claim 1, wherein:
said fluidized particles comprise aluminum oxide.

16. Apparatus as set forth in claim 2, wherein:
said bed of fluidized particles comprises a first lower layer of coarse particles within which said gas admission means is embedded, and a second upper layer of finer particles, disposed atop said first lower layer of coarse particles, within which said conduits and said infrared radiation sources are embedded.

17. Apparatus as set forth in claim 7 wherein:
said means for admitting a fluidized gas to said volume beneath said lamps includes means for connecting a source of nitrogen to said volume beneath said lamps.

18. Apparatus as set forth in claim 6, wherein:
said fluidized particles comprise aluminum oxide.

19. A heat treating apparatus comprising:
means including first and second opposing sidewalls for defining a volume for receiving a bed of fluidized particles having a predetermined elevation within said volume;
a bed of fluidized particles, having a predetermined elevation, disposed within said volumes;
a plurality of conduits of infra-red radiation transparent material disposed within said bed of fluidized particles beneath said predetermined elevation with said conduits extending between said sidewalls;
a plurality of electrically powered sources of infra-red radiation for generating infra-red radiation heat for treating said bed of fluidized particles, a one of said sources disposed within each one of said conduits so as to be protected by respective ones of said conduits from said fluidized particles of said bed of fluidized particles; and said plurality of sources including a plurality of separately controllable zones of said sources with each zone operable independent of others of said zones to permit varying infrared intensity between sources of different zones.

20. An apparatus as set forth in claim 6 wherein said plurality of conduits includes a plurality of separately controllable zones with sources of infrared radiation heat of each zone operable independent of others of said zones.

21. An apparatus for heat treating a product comprising:

means defining a volume for receiving a bed of fluidized particles having a predetermined elevation disposed within said volume;

a bed of fluidized particles, having a predetermined elevation, disposed within said volume;

a plurality of electrically powered infrared radiation generating lamps, for generating infrared radiation heat for heating said bed of fluidized particles, disposed within said bed with said particles surrounding each of said lamps for said particles opposing said lamps to be exposed to infrared radiation generated by said lamps;

said plurality of lamps divided into a plurality of separately controllable zones of said lamps with lamps of each zone operable independent of others of said zones to permit varying infrared intensity between lamps of different zones; and a plurality of infrared transparent conduits surrounding each of said lamps.

22. An apparatus for heat treating a product, comprising:

a retort having walls for defining a predetermined volume;

a bed of fluidized particles disposed within said predetermined volume;

a plurality of electrically powered infrared radiation generating lamps, for generating infrared radiation heat for heating said bed of fluidized particles, each of said lamps disposed submerged within said bed and surrounded by said particles for said particles surrounding said lamps to be exposed to infrared radiation generated by said lamps; and a plurality of infrared transparent conduits surrounding each of said lamps.

* * * * *

UNITED STATES PATENT AND TRADEMARK OFFICE
CERTIFICATE OF CORRECTION

PATENT NO. : 5,294,095                    Page 1 of 2

DATED : March 15, 1994

INVENTOR(S) : James E. Heath et al.

It is certified that error appears in the above-identified patent and that said Letters Patent is hereby corrected as shown below:

At Abstract, Title page, line 4, delete "at" after the word "particles".

At column 1, line 18, insert --,-- after the words "for example".

At column 1, line 27, "with" should read --within--.

At column 2, line 41, "19" should read --18--.

At column 2, line 62, insert --bus-- after the word "the".

At column 3, line 42, insert --means of-- after the word "through".

At column 5, line 35, "layers" should read --layer--.

At column 6, line 57, "infra-red" should read --infrared--.

At column 6, line 63, "infra-red" should read --infrared--.

UNITED STATES PATENT AND TRADEMARK OFFICE
CERTIFICATE OF CORRECTION

PATENT NO. : 5,294,095
DATED : March 15, 1994
INVENTOR(S) : James E. Heath, et al It is certified that error appears in the above-indentified patent and that said Letters Patent is hereby corrected as shown below:

At column 6, line 64, "treating" should read --heating--.

Signed and Sealed this

Twenty-seventh Day of September, 1994

Attest:

BRUCE LEHMAN

Attesting Officer

Commissioner of Patents and Trademarks